Nov. 9, 1954 J. F. LAIDIG 2,694,142

SIGNAL-TO-NOISE ENERGY DETECTION UNIT

Filed Nov. 10, 1949

INVENTOR
J. F. LAIDIG
BY N. S. Ewing
ATTORNEY

United States Patent Office 2,694,142

Patented Nov. 9, 1954

2,694,142

SIGNAL-TO-NOISE ENERGY DETECTION UNIT

John F. Laidig, Mine Hill Township, Morris County, N. J., assignor to Bell Telephone Laboratories, Incorporated, New York, N. Y., a corporation of New York Application November 10, 1949, Serial No. 126,481

6 Claims. (Cl. 250—20)

Figures 1, 2:
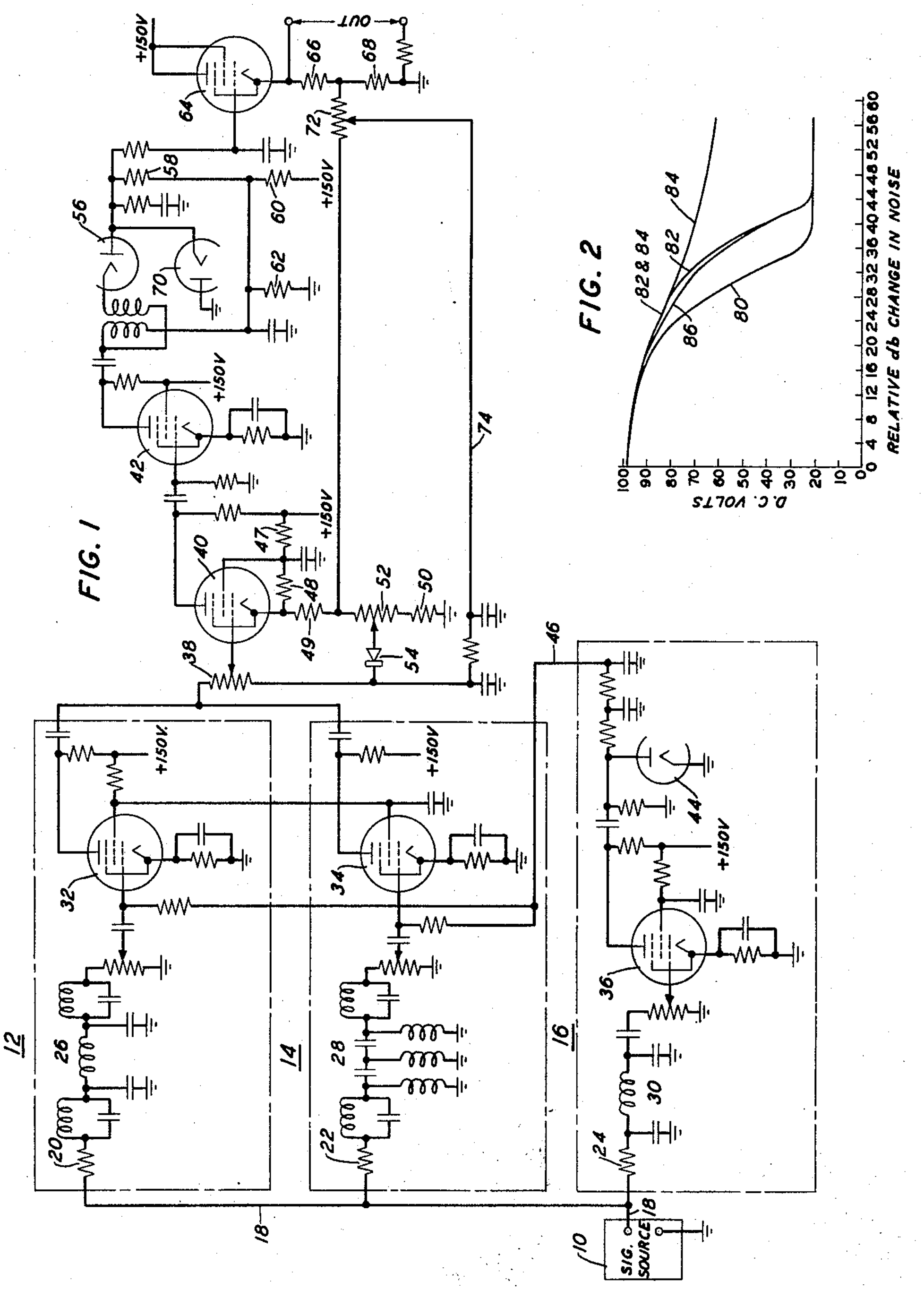

This invention relates to electric signaling systems and more particularly it is concerned with methods and means for determining the merit or desirability of message signal waves.

It is an object of the invention to improve the means and methods for ascertaining the merit or desirability of message signal waves that may be accompanied by interfering wave components.

It is also an object of this invention to make possible a continuous determination of the relative amount of interfering noise energy that accompanies a train of message signal waves.

It is a further object of this invention to make possible the provision of an electric signal, the characteristics of which reflect the changing ratio of the noise and signal energies in a train of message signal waves.

In certain types of communication systems, it is frequently desirable to receive at a number of geographically separated locations the same message signal, and to select from the entire group of received signals only that train of signal waves which at any instant provides the best communication channel. Multiple reception of this type is frequently employed in mobile radio communications systems and in systems in which the message signals are transmitted through a variable transmission medium. In these types of systems, it frequently happens that the merit or desirability of the signal waves that are received in one location is considerably greater than that of those that are received at a different location. Where multiple reception is employed, it is generally believed to be desirable to select, at any instant, only one such train of received message signals, for if two or more such signal trains are combined the phase relations of the combined currents may be such as to produce a detrimental or undesirable effect. Furthermore, such message signal waves are usually accompanied to a greater or a lesser degree by noise signal currents, and where such signal waves are directly combined the more desirable train of signal waves may be impaired by the noise energies that accompany the other and less desirable train of waves.

Receiver selector systems have been proposed in which the noise energy accompanying each train of received signal waves is portrayed in the form of a unidirectional voltage, the magnitude of which varies as the noise energy fluctuates. The various noise-indicating unidirectional voltages are compared, and the message signal receiver that produces the most desirable voltage and the message signal waves of minimum noise content is selected. One such selector system is disclosed and claimed in the application of W. R. Young, Jr., Serial No. 94,448, filed May 20, 1949, Patent No. 2,636,982, dated April 28, 1953. The noise-energy detecting unit which forms a part of this system is also disclosed and claimed in the W. R. Young, Jr. divisional application, Serial No. 104,625, filed July 14, 1949, Patent No. 2,648,765, dated August 11, 1953. The subject invention is directed to an improvement of this noise detecting unit described and claimed in the last-mentioned application. As in the case of the previously referred to noise detecting unit, it is expected that several noise detecting units in accordance with this invention, one each of which may be located at the same location as the signal receiver, will be utilized in a receiver selector system; and that some suitable selector unit will be employed to compare the noise indicating signals and to connect to a common signaling channel the output of the message receiver that produces the selected signal.

In accordance with the present invention, the transmitted message signal wave is received by conventional means and a portion of the audio frequency output wave is supplied to the noise detecting unit. The noise components above and below but not within the band of message signal frequencies are separated and are separately amplified before they are combined in a further amplification channel which is common to the two noise branches. The combined noise energy is then amplified and detected to produce a unidirectional voltage, the magnitude of which decreases as the magnitude of the noise components increases. For input noise energy below a given energy level, the produced unidirectional signal voltage varies as an exponential function of the input noise, and for values of input noise in excess of this predetermined level, the unidirectional voltage varies substantially linearly with changes in the input noise. This noise-indicating unidirectional voltage is available for further use in a receiver selector system to control the selection of a desired message signal receiver in the manner described in the previously mentioned Young, Jr. applications.

The manner in which this invention accomplishes the previously described functions may be best understood from the following detailed description of an embodiment of the invention, when considered in conjunction with the drawing, in which:

Fig. 1 is a schematic diagram of a noise energy detecting unit arranged in accordance with the invention; and Fig. 2 is a group of noise input-voltage output curves that disclose the transmission characteristics of the noise detecting unit of Fig. 1.

Referring to Fig. 1, audio frequency message waves are received from signal source 10, which may be a conventional radio receiver. These message waves will ordinarily be accompanied by noise wave components which, in combination with the signal wave components, are supplied to the segregating branches 12, 14 and 16 of the noise detector unit over connecting circuit 18. Each segregating branch comprises an impedance matching resistor 20, 22 or 24 and a wave filter 26, 28 or 30. Filter 26 passes frequencies below 200 cycles per second; filter 28 passes frequency components above 7,000 cycles per second, and filter 30 transmits the audio frequency message signal waves between 200 and 4,000 cycles per second. Each segregating branch includes an amplifier which includes a vacuum tube 32, 34 or 36, the gain of which is separately controllable by an individual input potentiometer. The output of amplifier 36 is supplied to a unidirectional conducting device 44, arranged in a negative voltage rectifying circuit. The varying unidirectional voltage output of this circuit is connected over conductor 46 to the control-grid electrodes of pentodes 32, 34. The outputs of segregating branches 12 and 14 are combined in potentiometer 38 before they are amplified in a two-stage amplifier comprising tubes 40 and 42. Amplifier tubes 32, 34, 36 and 40 may be any suitable type, such as 401–A pentode tubes. The second amplifier tube 42 may suitably be a 6AK6 type pentode or other suitable voltage amplifying type of tube. The cathode of pentode amplifier 40 is connected to a voltage divider comprising resistors 47, 48, 49, 50 and potentiometer 52 in such fashion that for a condition of no input noise it is normally about 2½ or 3 volts positive with respect to its associated control grid electrode when a type 401–A tube is used. A unilaterally conducting device 54 is connected between the arm of potentiometer 52 and the lower end of combining potentiometer 38 in such fashion that the control electrode of pentode 40 may never become more negative with respect to its associated cathode electrode than a predetermined amount controlled by the position of the movable contact of potentiometer 52. The output of noise amplifier 42 is connected in a negative-voltage rectifying circuit comprising the unilaterally conducting device or diode 56 and load resistor 58, where it is combined with a positive polarity voltage, which may suitably be about 100 volts, as obtained from the voltage divider comprising resistors 60, 62. The anode or plate of noise rectifying diode 56 is connected to the cathode of an oppositely poled unilaterally conducting device or diode 70 so that the combined voltage at the anode of diode 56 can never become negative with respect to ground potential. The combination of this added positive voltage and the rectified negative voltage produces a variable voltage which changes from about 100 volts, when there is no noise derived from signal source 10, by an amount that is proportional to the magnitude of the noise components that are rectified by diode 56. This variable positive unidirectional voltage is supplied to the control grid electrode of pentode 64, which may suitably be of the type 6AS5, and which is arranged as a conventional cathode follower including load resistors 66, 68 in its cathode circuit. Resistors 66, 68 may be proportioned as desired to produce a suitable amount of feedback voltage. In this described embodiment, resistor 66 was about four times as large as resistor 68, and they were so proportioned that with no noise signal input the potentials at the junction of 66, 68 at the junction of resistor 49 and potentiometer 52 were equal. This arrangement provides maximum gain when no noise is present in the applied signal wave. Feedback potentiometer 72 is connected between the junction of resistors 66, 68 in the cathode circuit of pentode 64 and the junction of cathode resistor 49 and potentiometer 52 in the cathode circuit of the first noise amplifier 40. The arm of potentiometer 72 is connected over circuit 74 to the lower terminal of combining potentiometer 38 and to one terminal of the unilaterally conducting device 54 in the control grid-cathode circuit of amplifying pentode 40.

The manner in which the above-described device functions will now be explained. Message signal waves accompanied by noise components are received from signal source 10 and are supplied to the input filter circuits 26, 28, 30 over connecting circuit 18. Noise components below 200 cycles per second are segregated by filter 26 and are amplified in the circuit of pentode amplifier 32. Noise components above about 7,000 cycles per second are segregated by filter 28 and are amplified in the circuit of pentode amplifier 34. The outputs of these two amplifying circuits are combined in potentiometer 38 to which is connected the control electrode of amplifying pentode 40. The combined noise components as received from branches 12, 14 and combined in potentiometer 38 are amplified in pentodes 40, 42 and detected in the anode circuit of diode 56. This energy appears as a voltage across load resistor 58 with the upper terminal of load resistor 58 being negative. Load resistor 58 is also supplied with a positive potential of about 100 volts as derived from the voltage divider 60, 62. Therefore, when no noise components are supplied to the control electrode of pentode 40, the potential at the upper terminal of load resistor 58, and at the control electrode of cathode-follower pentode 64, is about 100 volts positive with respect to ground. As the noise components that are supplied to pentode 40 increase in magnitude, the potential at the upper terminal of load resistor 58 is proportionally decreased from its 100-volt value. This potential never becomes negative with respect to ground because the unidirectionally conducting device or diode 70 is conductively connected between ground potential and the upper terminal of resistor 58. The voltage generated across resistors 66, 68 in the cathode circuit of pentode 64 is proportional to the potential existing on the control electrode of this tube. Therefore, as the input noise components increase in magnitude, the voltage generated across these resistors decreases from its maximum value which in this described embodiment is about 100 volts. The maximum value of voltage generated across resistor 68 is preferably approximately equal to the voltage which appears at the junction of cathode resistor 49 and potentiometer 52. Therefore, the reduction in voltage across resistor 68, as the input noise components increase in magnitude, appears as a difference in potential across potentiometer 72, and an optional amount of this potential difference is fed back over connecting circuit 74 to the control electrode of pentode 40. As the magnitude of the noise components supplied to the control electrode of pentode 40 increases, the potential applied over connecting circuit 74 to this control electrode decreases thereby increasing the bias applied to pentode 40 so that the transmission characteristic through this amplifier varies as an inverse exponential function of the applied noise energy. The unilaterally conducting device 54 effectively presents a one-direction short circuiting path between the arm of potentiometer 52 and the lower terminal of potentiometer 38. Whenever the voltage at the movable arm of potentiometer 72 decreases to such value that the biasing potential on the control electrode of pentode 40 becomes equal to or slightly less than the potential at the arm of potentiometer 52, the unilateral device 54 becomes conductive and prevents further reduction in the bias on this electrode. Thus, whenever the voltage on the connecting circuit 74 decreases to a predetermined value, as determined by the position of the arm of potentiometer 52, the controlling effect of the fed-back voltage is stabilized, and subsequent decreases in the magnitude of this fed-back voltage are ineffective in changing the transmission characteristic of amplifying pentode 40.

In most communication systems in which non-linear circuit elements are employed, message signal inputs of exceptionally high level are productive of modulation distortion products. These are sometimes called sum and difference products, and they generally include components in the spectrum above and below the message signal frequencies. Since it is the noise energy in these portions of the spectrum that is utilized as an indication of the signal-to-noise ratio or signal merit, and since there is no feature of these distortion products that readily distinguishes them from the ordinary noise components, it is apparent that the presence of these distortion products may be taken as an indication of inferior signal merit if no precautionary measures are taken. To prevent this situation from arising, the message signal energy level is utilized to control the amplification of the noise energy in the noise amplifiers 32 and 34. Message signal wave components within the signal frequency band of 300 to 4000 cycles per second are segregated by wave filter 30 and are amplified in the circuit of tube 36. This signal energy is detected in the load circuit of diode 44 to produce a potential, negative with reference to ground potential, the magnitude of which is proportional to the level of the message signal energy. This potential is supplied over connecting circuit 46 to the control electrodes of noise-amplifying tubes 32 and 34 where it decreases the gain in these tubes as the message signal energy level increases. Since the distortion products arise during periods of high signal energy and the gain of the noise-amplifying circuits are decreased during this same period it follows that these distortion products do not produce spurious indications of inferior signal conditions.

The nature of the transmission characteristic of the combined-channel portion of the circuit, and the effect of varying the settings of potentiometers 52 and 72 may be best realized from an inspection of the curves of Fig. 2. Each of these curves depicts the transmission characteristic from the input of the combined-channel amplifying pentode 40 to the output terminals designated "Out" as the magnitude of the applied noise energy is varied. Each of the curves shows the variation in the unidirectional voltage that is developed across the cathode resistors 66, 68 as the magnitudes of the noise components that are applied to the input of pentode 40 are increased from a zero-reference level that produces maximum output voltage across these cathode resistors. Curve 80 shows the input noise-output voltage characteristic of a tested embodiment of a noise detecting unit in accordance with this invention when the arm of feedback-limit control potentiometer 52 is in its position of minimum feedback nearest resistor 49, and the arm of feedback control potentiometer 72 is positioned for maximum feedback, adjacent to the junction of resistors 66, 68. Curves 82 and 84 show the effect of varying the position of the movable arm of potentiometer 52, while potentiometer 72 remains in its maximum feedback position. In curve 82, the arm of potentiometer 52 is positioned at an intermediate point such that the output voltage is 40 volts when the noise input is increased 40 decibels from its zero-reference level; at which the output voltage has its maximum value. In curve 84, the arm of potentiometer 52 is moved to its maximum feedback position adjacent to resistor 50. The combined regulatory effect that is exerted by both the feedback control 72 and the feedback limit control 52 is shown in curve 86. In this curve the arm of feedback control potentiometer 72 is set at about its two-thirds maximum position, nearest its right terminal, while the arm of feedback limit control potentiometer 52 is positioned as in curve 82; namely, such that the output voltage is 40 volts when the noise input is increased 40 decibels from its zero-reference level.

From this family of representative transmission characteristic curves it will be seen that by selectively positioning the arms of potentiometers 52 and 72 the amplification of pentode 40 may be so controlled that the transmission characteristic of the overall unit may be changed over a wide range. This arrangement permits a choice of sensitivities in the receiver selector system at high noise values. In other words, it permits a high degree of selectivity, or recognition of a slight signal-to-noise improvement when the noise level is high on all channels of the system; while at the same time rendering the selection system insensitive to slight improvements when the noise energy is low on all channels.

The invention has been described as being incorporated in a noise energy detecting unit of specified parameters and circuit constants. It should be understood that the invention is not limited to this described embodiment and that variations which do not depart from the spirit and scope of the invention will suggest themselves to those skilled in the related art.

What is claimed is:

1. A device for producing an electric signal indicative of the magnitude of the noise energy accompanying a train of message signal waves which device comprises input terminals to which said message signal waves are supplied, a pair of frequency sensitive circuits connected to said terminals for segregating noise energy above and below the message signal energy from said signal energy, first amplifying means for separately controlling the magnitudes of said separated noise energies, means for combining said separately amplified noise energies, a second amplifying means for amplifying said combined noise energy, means including a unilaterally conducting device for converting combined noise energies into a unidirectional electric signal, means for variably controlling the amplification characteristic of said second amplifying means in accordance with variations in the magnitude from said unidirectional signal when said magnitude is in excess of a predetermined value, and means for maintaining constant said controlling effect when said unidirectional electric signal decreases below said value.

2. A device for producing an electric signal indicative of the magnitude of the noise energy accompanying a train of message signal waves which device comprises input terminals to which said message signal waves are supplied, a pair of frequency sensitive circuits connected to said terminals for segregating the noise energies above and below the message signal energy from said message signal energy, a first amplifying means for separately controlling the magnitudes of said sepaarted noise energies, means for combining said separately amplified noise energies, a second amplifying means for amplifying said combined noise energies, said last-mentioned means including a unilaterally conducting device for converting said combined noise energies into a unidirectional electric signal, means for applying a portion of said electric signal to said second amplifying means to control the transmission characteristic of said amplifying means, and variable means for limiting the amount of said applied electric signal when the magnitude of said noise components exceeds a predetermined value.

3. In a device for producing a variable unidirectional voltage the magnitude of which is indicative of the electric energy contained within a predetermined portion of the frequency spectrum of an electric wave, frequency sensitive means for segregating the wave's components above and below the signal wave components from said signal wave components, amplifying means for controlling the amplitude of said components above and below said signal wave components, unilaterally conducting means for detecting energy in said amplified components, means for converting said detected energy into a unidirectional voltage the magnitude of which decreases as the magnitude of said amplified components increases, means for variably controlling the amplifying characteristic of said amplifying means in accordance with the magnitude of said unidirectional voltage, means for maintaining substantially constant the characteristic of said amplifying means notwithstanding changes in the magnitude of said unidirectional voltage when said magnitude becomes less than a predetermined value, and means responsive to the energy component of said segregated signal wave components for controlling the magnitude of said segregated noise components before said noise components are amplified.

4. A device for producing an electric signal indicative of the magnitude of the noise energy accompanying a train of message signal waves which device comprises input terminals to which said message signal wave and said noise components are supplied, a plurality of frequency sensitive circuits connected to said terminals for segregating the noise energies above and below the message signal energy from said message signal energy, first amplifying means for controlling the magnitudes of said separated noise energies, second amplifying means for amplifying the combined noise energies, means including a unilaterally conducting device for converting said amplified noise energies into a unidirectional electric signal, means for variably controlling the amplification characteristic of said second amplifying means in accordance with variations in the magnitude of said unidirectional signal when said signal is in excess of a predetermined value, means for maintaining constant said controlling effect when said unidirectional electric signal decreases below said predetermined value and means responsive to said segregated message signal components for increasing the magnitude of said derived unidirectional electric signal as the magnitude of said segregated message signal components increases.

5. A unit for deriving an indication of the magnitude of the noise energy components accompanying a band of message signal frequencies which comprises means for segregating said noise components in the frequency spectrum above and below but not within the band of signal frequencies, means for amplifying and detecting said segregated noise components, means responsive to the segregated noise components for controlling said amplification as a non-linear function for input components below a predetermined amplitude level and additional means responsive to the segregated noise components for controlling said amplification as a substantially linear function for input components above said predetermined amplitude level.

6. A unit for deriving an indication of the magnitude of the noise energy components accompanying a band of message signal frequencies which comprises means for segregating said noise components in the frequency spectrum above and below but not within the band of message signal frequencies, from said signal components, means for amplifying and detecting said segregated noise components and said message signal components, means responsive to the detected noise components for controlling the amplification of said noise components as a non-linear function for input noise components below a predetermined amplitude level, additional means responsive to the detected noise components for controlling said amplification as a substantially linear function for input components above said predetermined amplitude level, and means responsive to said detected message signal components for controlling the amplitude of said segregated noise signal components whereby the amplitude of said noise components is decreased as the amplitude of said detected message signal components is increased.

References Cited in the file of this patent

UNITED STATES PATENTS

| Number | Name | Date |
|---|---|---|
| 2,098,286 | Garfield | Nov. 9, 1937 |
| 2,117,664 | Holst | May 17, 1938 |
| 2,144,224 | Koch | Jan. 17, 1939 |
| 2,239,901 | Percival | Apr. 29, 1941 |
| 2,261,951 | Bloch | Nov. 11, 1941 |
| 2,269,011 | Dallos | Jan. 6, 1942 |
| 2,311,696 | Rubin | Feb. 23, 1943 |
| 2,504,341 | Matthews | Apr. 18, 1950 |
| 2,586,190 | Wasmansdorff | Feb. 19, 1952 |
| 2,588,031 | O'Brien et al. | Mar. 4, 1952 |